United States Patent

Lee et al.

[11] Patent Number: 5,737,148
[45] Date of Patent: Apr. 7, 1998

[54] CASSETTE HOUSING GUIDE APPARATUS OF TAPE RECORDER IN WHICH BOTH SIDES OF HOUSING LOCK INTO PLACE

[75] Inventors: Phil-hong Lee; Young-ho Cho, both of Suwon, Rep. of Korea

[73] Assignee: Samsung Electronics Co., Ltd., Kyungki-do, Rep. of Korea

[21] Appl. No.: 649,765

[22] Filed: May 15, 1996

[30] Foreign Application Priority Data

Oct. 16, 1995 [KR] Rep. of Korea ............... 1995-35667

[51] Int. Cl.⁶ .......................................... G11B 15/675
[52] U.S. Cl. .......................... 360/96.5; 242/338.4
[58] Field of Search ................... 360/96.6, 96.5; 242/338.4

[56] References Cited

U.S. PATENT DOCUMENTS 3,950,787  4/1976  Hosaka ................... 360/96.6
4,301,484  11/1981  Sawaguchi et al. ........... 360/96.6
5,481,419  1/1996  Fujishiro ..................... 360/96.5

*Primary Examiner*—Craig A. Renner
*Attorney, Agent, or Firm*—Sughrue, Mion, Zinn, Macpeak & Seas, PLLC

[57] ABSTRACT

A cassette housing guide apparatus has a structure for stably placing a tape cassette with respect to a deck member. The apparatus includes a protrusion formed on the leading end portion of one side of a housing designed for receiving the tape cassette, and a guide member for guiding the protrusion with respect to the deck member and keeping the protrusion in place. The other side of the housing is provided with a locking unit for locking the housing with respect to the deck member.

6 Claims, 4 Drawing Sheets

CASSETTE HOUSING GUIDE APPARATUS OF TAPE RECORDER IN WHICH BOTH SIDES OF HOUSING LOCK INTO PLACE

BACKGROUND OF THE INVENTION

The present invention relates to a cassette housing guide apparatus of a tape recorder and, more particularly, to a cassette housing guide apparatus of a tape recorder in which both the left side and the right side of a housing lock into place so that a tape cassette inserted in the housing can be stably placed on two reels installed on a deck.

Generally, a top loading method in which a tape cassette is loaded from the top and positioned to a lower portion of an apparatus is applied to tape recorders such as camcorders. In the top loading method as shown in FIG. 1, chassis members 20 and 21 are installed at both sides of a deck member 10 having a head drum 11 and reels 12 and 13 mounted thereon. A housing assembly 100 which accepts a tape cassette 200 is rotatably engaged to the chassis members 20 and 21. In this top loading method, a locking apparatus for the housing is usually installed on only one side of the housing assembly. Accordingly, the housing is locked into place with only one side of the housing having pressure on it.

The housing assembly 100 includes a housing 80 for accepting the tape cassette 200, which is inserted in the "A" direction and supporting means for supporting the housing 80 to ascend and descend. The supporting means includes first and second arm members 30 and 40 on one side and third and fourth arm members 50 and 60 on the other side. The supporting arm members on each side are connected to each other like scissors by pins 35 and 55, respectively, at the center of the housing 80. The first and second arm members 30 and 40 and third and fourth arm members 50 and 60 also have spring members 45 and 65, respectively, connected to their upper ends and providing a restoring force to keep the housing 80 in an ascended state.

Guide slots 41 and 42 and guide slots 61 and 62 are formed on the second and fourth arm members 40 and 60, respectively. The guide slots 42 and 62 are slidingly connected to both sides of the housing 80, whereas the guide slots 41 and 61 are slidingly connected to guide pins 22 and 23 of the chassis members 20 and 21, respectively. One end portion of the first arm member 30 and one end portion of the third arm member 50 have coupling pins 34 and 54, respectively, which rotatably engage in coupling holes 21' and 20' of chassis members 21 and 20.

A shaft 70 which extends across the housing 80 is installed on the inside at one end of the housing 80. The ends of the shaft 70 have first and second gears 71 and 72 attached to them. The ends of the first and third arm members 30 and 50 have first and second sector gears 31 and 51 that engage with the first and second gears 71 and 72, respectively.

A locking apparatus (not shown) of chassis member 21 locks onto a locking pin 32 which is formed on one side of the housing 80. When the housing 80 is pressed down after a tape cassette 200 is inserted into the housing 80 of the housing assembly 100, the locking pin 32 locks onto the locking apparatus placing the tape cassette 200 stably on the reels 12 and 13.

However, when only one side of the housing 80 is locked into place, the restoring force of the spring 65 on the side without a locking apparatus may force that side of the tape cassette 200 to come undone from the reel table.

Since the tape cassette 200 rests unstably on the reels 12 and 13, the tape cassette 200 shakes when the tape is running. Thus, quality deteriorates during recording and reproducing.

SUMMARY OF THE INVENTION

Accordingly, it is an object of the present invention to provide a cassette housing guide apparatus of a tape recorder having an improved structure so that a tape cassette can be placed stably on the deck.

To accomplish the above object of the present invention, there is provided a cassette housing guide apparatus of a tape recorder, comprising: a deck member having reel tables installed thereon; a housing supported on the deck member and movable up and down with respect to the deck member, the housing being operative to receive a tape cassette; a pair of arm members installed at each side of the housing for supporting the housing on the deck member; a locking unit for locking one side of the housing to one side of the deck member; and means for guiding another side of the housing and keeping the other side of the housing in place, while the one side of the housing is locked by the locking unit.

The guiding means is provided with a protrusion formed on the leading end portion of the housing and a guide member for guiding the protrusion with respect to the deck member. While the housing descends and locks onto the deck member, the protrusion is slidingly guided under the guide member. Accordingly, when one side of the housing locks onto the deck member by the locking unit, the other side of the housing is kept in place by the guiding means.

It is preferable to install a guide roller on the protrusion so that the guide roller smoothly slides under the guide member while reducing noise.

In a housing guide apparatus according to the present invention, when the locking unit locks one side of the housing, the guiding means guides the other side of the housing. This allows both sides of the housing to be level with the deck plane. Accordingly, a tape cassette can be securely placed at its appropriate position on the reels.

BRIEF DESCRIPTION OF THE DRAWINGS

The above object and advantages of the present invention will become more apparent by describing in detail preferred embodiments thereof with reference to the accompanying drawings, in which.

DETAILED DESCRIPTION OF THE PREFERRED EMBODIMENTS

Figure 1:
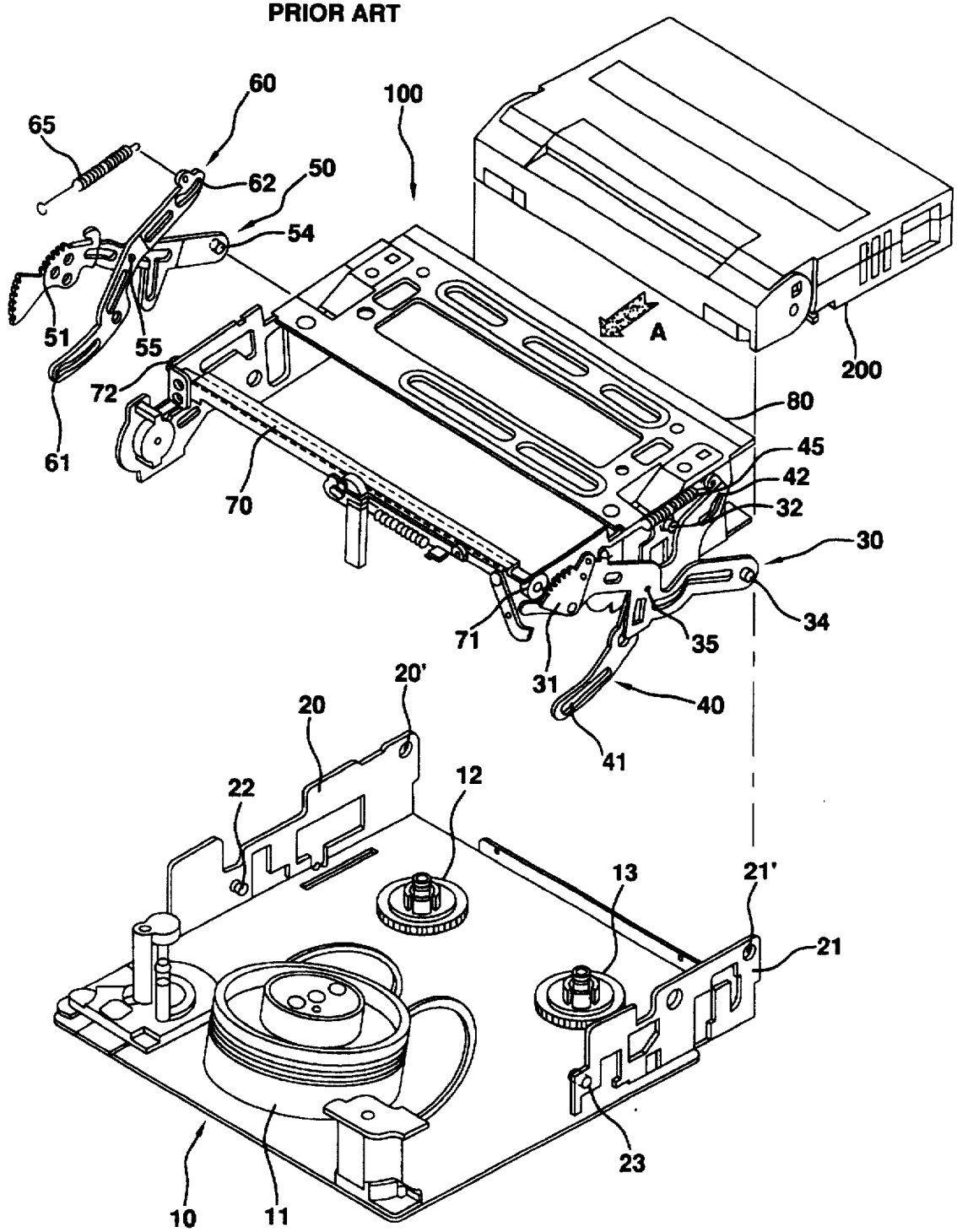
FIG. 1 is a perspective view of a previously proposed housing assembly of a tape recorder.
Figure 2:
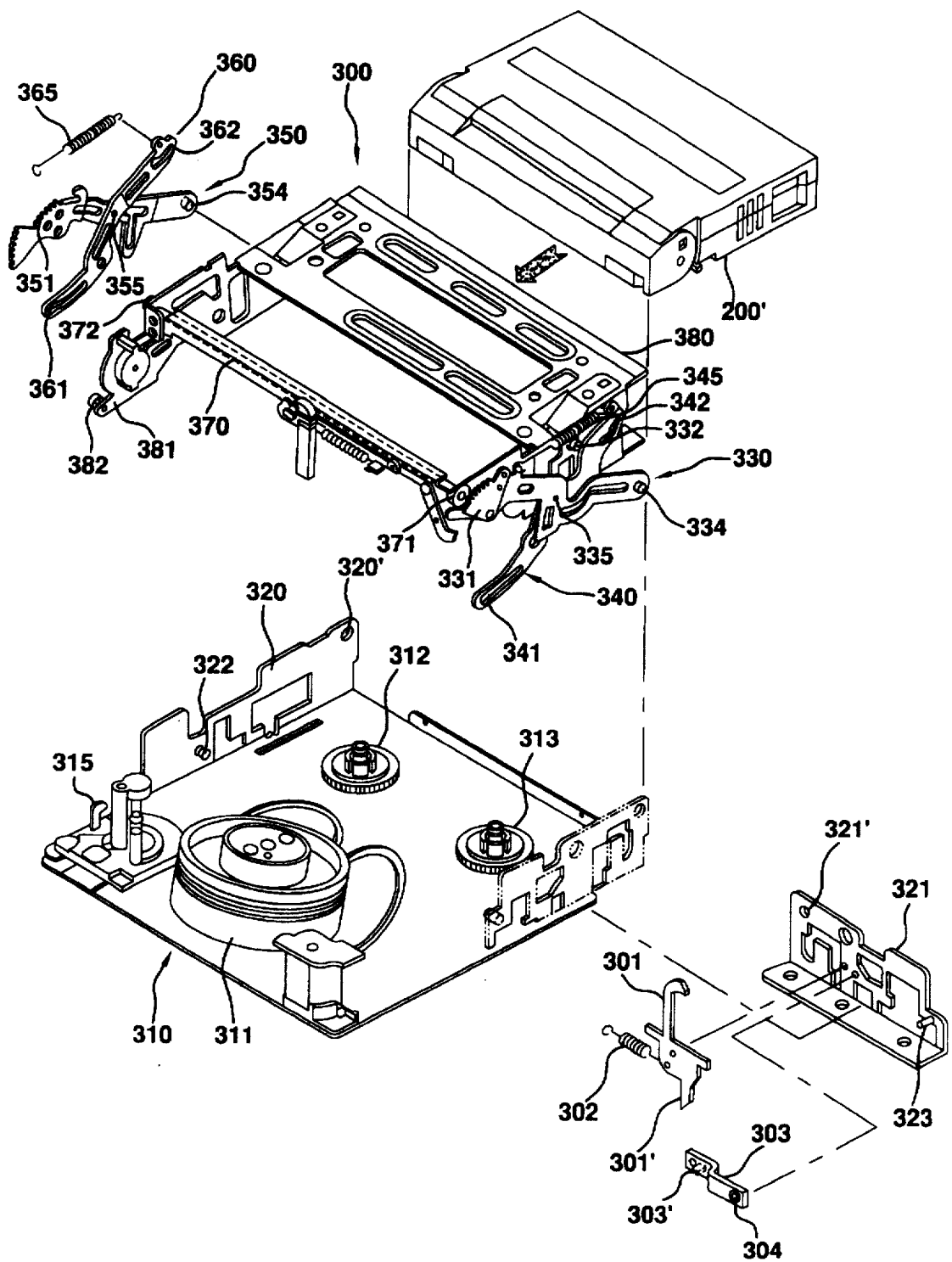
FIG. 2 is a perspective view of a housing guide apparatus according to the present invention.

Referring to FIG. 2, a housing assembly 300 for accepting a tape cassette 200' is rotatably attached to chassis members 320 and 321 which are located on the sides of a deck member 310 having a head drum 311 and reels 312 and 313 mounted thereon.

The housing assembly 300 has a housing 380 for accepting the tape cassette 200' and supporting means for supporting the housing 380 and allowing it to move up and down. The supporting means includes first and second arm members 330 and 340 and third and fourth arm members 350 and 360. The supporting arm members on each side of the housing 380 are connected to each other like scissors by pins 335 and 355, respectively. The first and second arm members 330 and 340 and the third and fourth arm members 350 and 360 also have spring members 345 and 365, respectively, connected to their upper ends and providing a restoring force to keep the housing 380 in an ascended state.

Guide slots 341 and 342 and guide slots 361 and 362 are formed on the second and fourth arm members 340 and 360, respectively. The guide slots 342 and 362 are slidingly connected to both sides of the housing 380, whereas the guide slots 341 and 361 are slidingly connected to guide pins 322 and 323 of the chassis members 320 and 321. One end portion of the first arm member 330 and one end portion of the third arm member 350 have coupling pins 334 and 354, respectively, which rotatably engage in coupling holes 321' and 320' of the chassis members 321 and 320.

A shaft 370 which extends across the housing 380 is installed on the inside at one end of the housing 380. The ends of the shaft 370 have first and second gears 371 and 372 attached to them. The ends of the first and third arm members 330 and 350 have first and second sector gears 331 and 351 that engage with the first and second gears 371 and 372, respectively.

A locking pin 332 is formed on one side of the housing 380 onto which a locking unit 301 of chassis member 321 locks. There is also a lever member 303 on the chassis member 321 which interlocks with the locking unit 301. Here, the locking unit 301 and the lever member 303 are elastically biased clockwise by a spring 302 and a torsion spring 304, respectively. The locking unit 301 is supported by an extended piece 303' of the lever member 303. When the first arm member 330 rotates the lever member 303 counterclockwise as the housing 380 moves down, the locking unit 301 locks onto the locking pin 332 while being rotated clockwise by the spring 302. The locked state can be released by a predetermined operation of a releasing unit 301' of the locking unit 301 for rotating the locking unit 301 counterclockwise.

Figure 3:
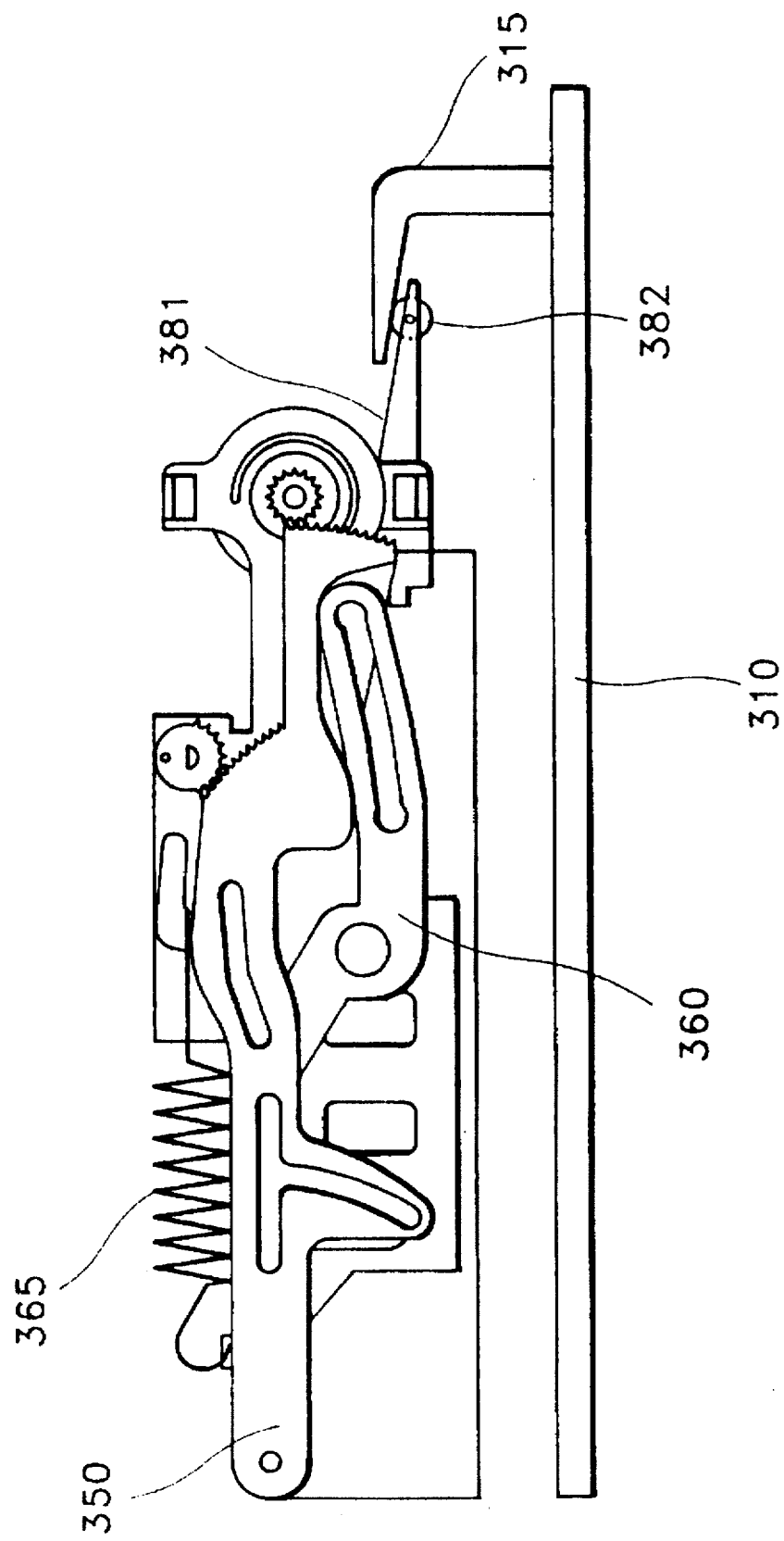
FIG. 3 is a side view of the housing guide apparatus of FIG. 2 in its locked position.
Figure 4:
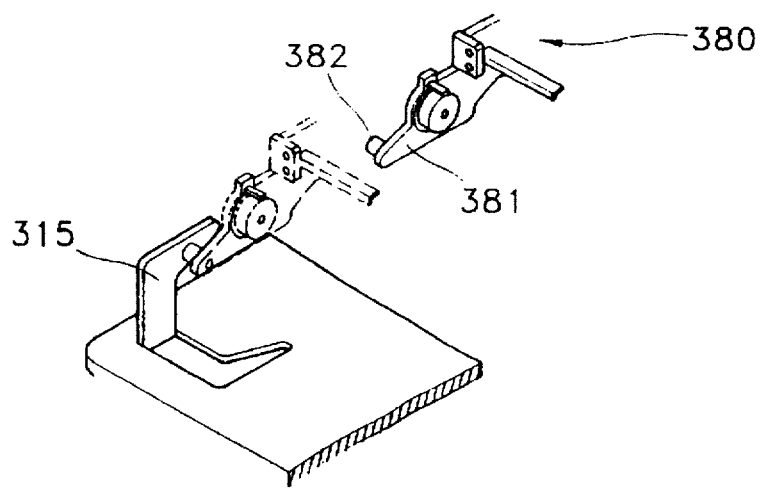
FIG. 4 is a view of essential parts extracted from FIG. 2.

While one side of the housing 380 is provided with the above-mentioned locking pin 332 for being locked by the locking unit 301 by pressing down on the housing 380, the other side of the housing 380 is provided with a guiding means for guiding the housing 380 with respect to the deck member 310. Referring to FIGS. 2, 3 and 4, the guiding means is provided with a protrusion 381 formed at the leading end portion of the housing 380 and a guide member 315 mounted on the deck member 310 for guiding the protrusion 381. Thus, when the housing 380 descends, the one side of the housing 380 is locked by means of the locking unit 301 and at the same time the protrusion 381 approaches and slides under the guide member 315. Accordingly, the one side of the housing 380 is locked by the locking unit 301 and the other side of the housing 380 is kept in place by the guide member 315.

As best shown in FIGS. 3 and 4, it is preferable to have a guide roller 382 provided on the protrusion 381 of the housing 380 so that the protrusion 381 slides smoothly under the guide member 315 as the guide roller 382 rotates on the guide member 315. The guide member 315, as shown in FIG. 4, can be formed as a bent piece from the deck member 310 by lancing, or, as shown in FIG. 5, of a separate piece assembled onto the deck member 310'.

Figure 5:
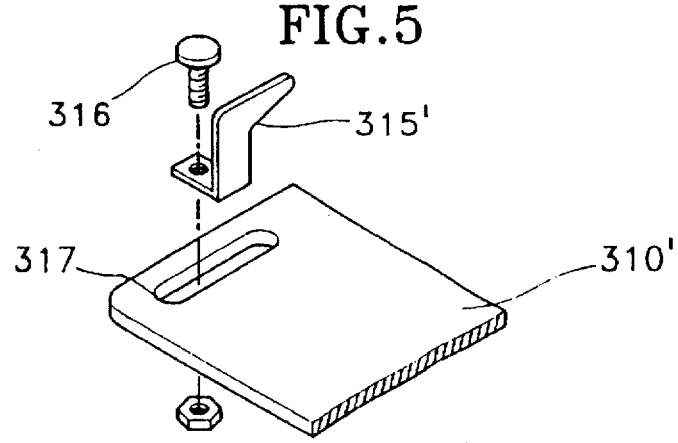
FIGS. 5 and 6 are schematic views of modified embodiments according to the present invention.

Referring to FIG. 5, a guide slot 317 is formed in the deck member 310', and the guide member 315' formed of the separate piece can be attached at any position along the guide slot 317 by a screw 316.

Figure 6:
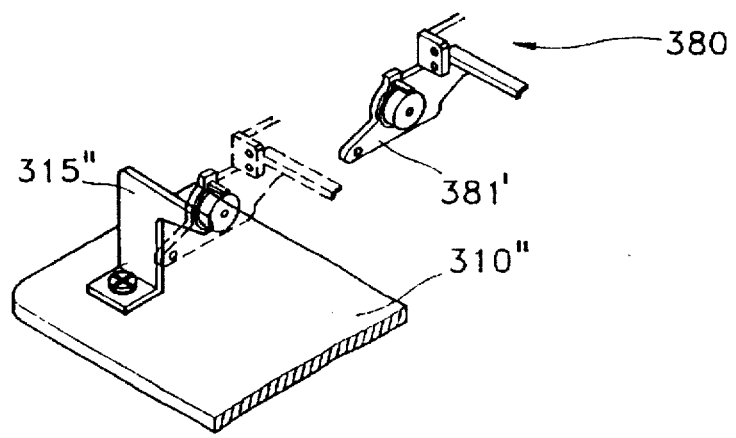

FIG. 6 shows a still further embodiment wherein the guide member 315" is mounted on the deck member 310" so as to be oriented perpendicularly with respect to the protrusion 381'.

A housing guide apparatus according to the present invention as described above operates as follows.

The tape cassette 200' is accepted into the housing 380 and the housing 380 descends so that the tape cassette 200' is placed on the reels 312 and 313. At this stage, the housing 380 descends by pressing down on the side of the housing 380 which is provided with the locking unit 301.

As the housing 380 descends, when the first arm member 330 rotates the lever member 303 counterclockwise, the locking unit 301 is rotated clockwise by the spring member 302. Then, the locking pin 332 is engaged and locked by the locking unit 301. Meanwhile, as one side of the housing 380 is being locked to the locking unit 301, the protrusion 381, 381' on the other side thereof, as shown in FIGS. 4 and 6, approaches the guide member 315, 315". Accordingly, despite a restoring force of the spring member 365, the housing 380 is kept in its proper position by the guide member 315, 315", thereby stably placing the cassette 200' on the reels 312 and 313.

If the protrusion 381 is provided with the guide roller 382 (FIGS. 3 and 4), noise is reduced as the protrusion 381 slides under the guide member 315.

In a housing guide apparatus according to the present invention, as described above, when one side of the housing 380 locks, the other side thereof is kept in place by a guide member, thus both sides of the housing 380 remain in a state of equilibrium despite a restoring force of the spring members 345 and 365. Accordingly, the tape cassette 200' can be stably placed on the reels 312 and 313, to thereby allow smooth running operation of the tape.

It is contemplated that numerous modifications may be made to the cassette housing guide apparatus of the present invention without departing from the spirit and scope of the invention as defined in the following claims.

What is claimed is:

1. A cassette housing guide apparatus of a tape recorder, comprising:

a deck member having reel tables installed thereon;

a housing supported on said deck member and movable up and down with respect to said deck member, said housing being operative to receive a tape cassette, said housing defining a first side and a second side;

a pair of arm members installed at each of said first and second sides of said housing and which support said housing on said deck member;

a locking unit which locks said first side of said housing to one side of said deck member; and means for guiding said second side of said housing and keeping said second side of said housing in place while said first side of said housing is locked by said locking unit, wherein said guiding means includes a fixed protrusion formed on a leading end portion of said housing and extending in a direction of insertion of the tape cassette, and an operationally fixed guide member, operationally fixed on said deck member, which guides said protrusion thereunder.

2. The cassette housing guide apparatus according to claim 1, further comprising an elongated guide slot formed in said deck member and to which said guide member is operationally fixed by coupling means, said coupling means being operative to permit non-operational adjustable horizontal positioning of said guide member along said elongated guide slot.

3. The cassette housing guide apparatus according to claim 1, wherein said fixed guide member comprises a bent piece which is cut from a body of said deck member and bent upwardly.

4. The cassette housing guide apparatus according to claim 1, wherein said guiding means further includes a guide roller installed on said fixed protrusion and slidingly guided under said operationally fixed guide member.

5. The cassette housing guide apparatus according to claim 4, further comprising an elongated guide slot formed in said deck member and to which said guide member is operationally fixed by coupling means, said coupling means being operative to permit non-operational adjustable horizontal positioning of said guide member with respect to said deck member along said elongated guide slot.

6. The cassette housing guide apparatus according to claim 4, wherein said fixed guide member comprises a bent piece which is cut from a body of said deck member and bent upwardly.

* * * * *